May 31, 1966  H. A. LEFLET, JR  3,253,898
APPARATUS FOR BENDING AND ANNEALING GLASS SHEETS
Filed Oct. 4, 1963  4 Sheets-Sheet 1

INVENTOR.
Herbert A. Leflet, Jr.
BY
Nobbe & Swope
ATTORNEYS

May 31, 1966  H. A. LEFLET, JR  3,253,898
APPARATUS FOR BENDING AND ANNEALING GLASS SHEETS
Filed Oct. 4, 1963  4 Sheets-Sheet 2

INVENTOR.
Herbert A. Leflet, Jr.
BY
Nobbe & Swope
ATTORNEYS

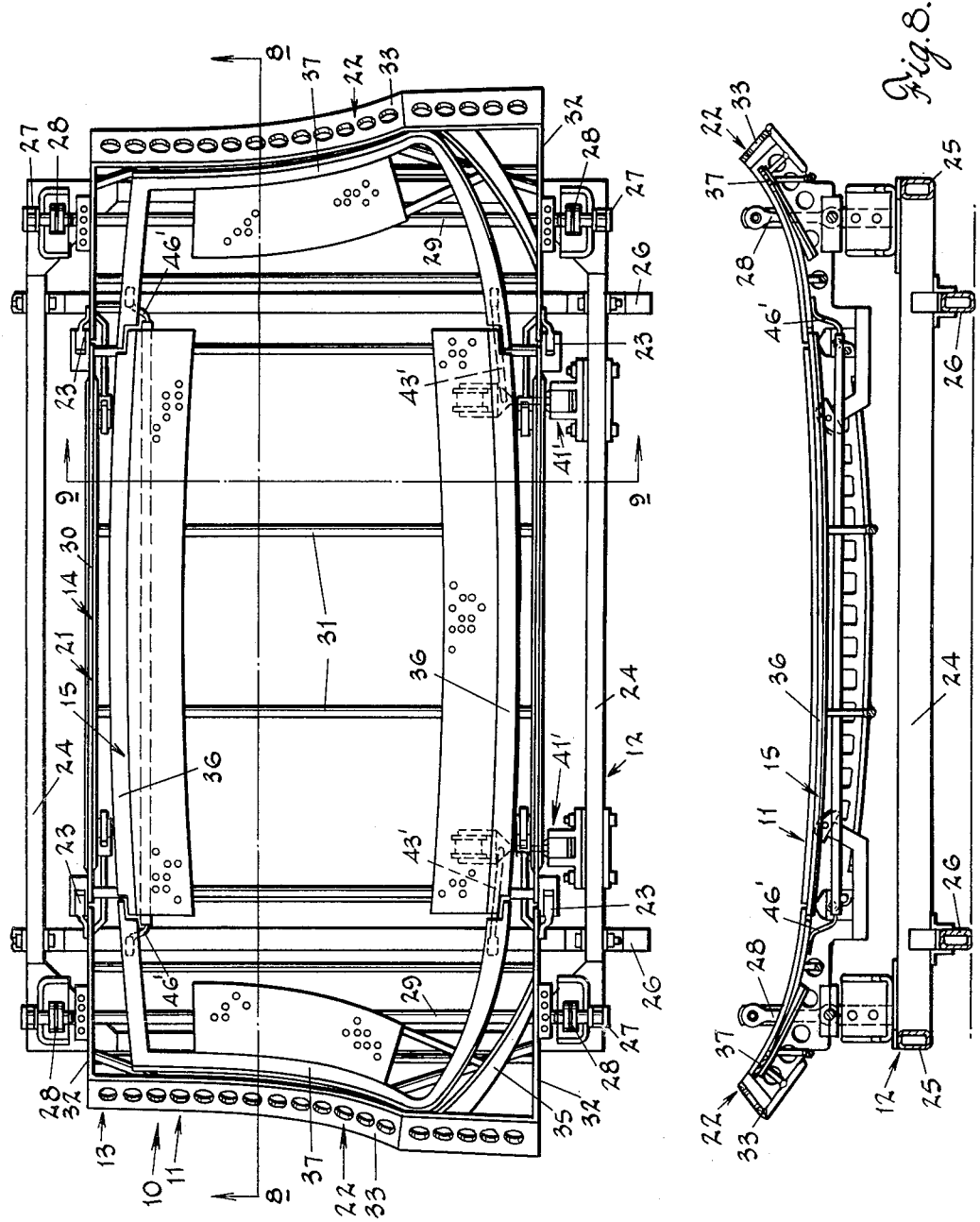

INVENTOR.
Herbert A. Leflet, Jr.
BY
Nobbe & Swope
ATTORNEYS

United States Patent Office 3,253,898
Patented May 31, 1966

3,253,898
APPARATUS FOR BENDING AND ANNEALING
GLASS SHEETS
Herbert A. Leflet, Jr., Toledo, Ohio, assignor to Libbey-Owens-Ford Glass Company, Toledo, Ohio, a corporation of Ohio
Filed Oct. 4, 1963, Ser. No. 313,918
9 Claims. (Cl. 65—287)

This application is a continuation-in-part of application Serial No. 171,862, filed February 8, 1962, now abandoned.

The present invention relates broadly to the production of bent sheets or plates of glass and more particularly to an improved method and apparatus for bending and annealing glass sheets.

As is well known, an inherent characteristic of glass is its capacity to physically respond to being heated and, subsequently, cooled whereby internal stresses are developed within a body of glass so treated. The particular stresses developed in the glass body are dependent upon the rate at which this body is cooled from an elevated temperature. By controlling the rate of cooling, a process commonly referred to as annealing, the resulting stresses in the glass body may be controlled. Moreover, by initiating different phases of heating and cooling in different areas of the glass body, it is possible to develop localized areas of tension and compression within the glass body. Naturally, in the glass body as a whole, at normal temperatures, a condition of stability or equilibrium exists wherein the areas in tension and the areas in compression are in balance.

Another well-known characteristic of glass is that structurally it is more rugged in nature and better able to resist chipping or breaking when the stresses within the glass are compressive. Thus glass sheets or those portions thereof which are in compression are found to withstand ordinary abuses of the type inflicted during normal handling more readily than glass sheets or portions thereof which are in tension.

The foregoing characteristics of glass may be utilized to advantage in the production of glass sheets intended for use in various applications. For example, it is ofttimes desirable to insure that specific areas of the glass sheet be tough or rugged and exhibit a pronounced resistance to damage; in other words that these areas of the sheet be in compression. Such would be the situation when sheets are intended to be used as glazing closures for vehicles or the like. In the later instance since it is the edges of the sheets which are most subject to abuse during handling, storing, shipping and, ultimately, installation in the vehicle opening, it is desirable that these edges be under compressive stress.

The production of glass sheets having a predetermined pattern of localized stresses therein comprises, generally, heating the sheets above an elevated temperature, commonly referred to as the annealing point, and controlling the rate of cooling of the glass through a range of decreasing temperatures known as the annealing range. Those portions of the sheet which cool rapidly develop compressive stress in the glass and, conversely, those portions which cool relatively slower develop tensile stress. Thus it will be apparent that the pattern of localized stresses may be controlled by artificially creating a differential between the rate of cooling of the various areas of the sheet.

In recent years, vehicle designers, particularly automobile designers, have leaned more and more toward the use of curved glazing closures which blend pleasingly into the over-all design of the vehicle. This trend has resulted in the necessity of cutting and bending flat sheets of glass to the rather intricate shapes dictated by the design of the vehicle.

The apparatus commonly used in the bending of glass sheets for glazing purposes includes a ring or skeleton type bending mold having shaping surfaces adapted to engage only the marginal edge portions of the sheets, to avoid marring the viewing area of the finished window, and conforming in elevation to the curvature of the sheet when bent. According to well-known bending practices, a flat sheet of glass is supported on the mold above the shaping surfaces and is heated in a furnace to a temperature corresponding to the softening point of glass whereupon the sheet sags by gravity into registry with the shaping surfaces. Usually, while the bent sheet is resting on the mold, it is cooled or annealed in a controlled manner to a point below the annealing range of glass.

During the bending process, the bending mold absorbs heat from the furnace and this residual heat counteracts the normal tendency of the glass to uniformly cool or anneal. With an outline type mold of the above-described character, it is the marginal edge portions of the sheet in the immediate vicinity of the shaping surfaces which are held at a higher heat for a longer period of time and which, therefore, normally have tensile stresses developed therein.

Heretofore, to overcome the obvious adverse effects of the outline type bending mold as regards the stress pattern in a finished sheet bent thereon, a procedure has been proposed which involves bending and annealing blank size sheets of glass on a mold especially constructed to produce predeterminately arranged areas of tension and compression whereby the pattern outline of the finished sheet can be located in areas of compression. In general, the bending mold constructed for use with this procedure includes a heat retaining member which functions as a thermal barrier in the same manner as the shaping surface of the mold functions. By arranging these members relative to the shaping surfaces to retard the cooling of preselected areas of the glass sheet and thereby to create areas of tension which are spaced from the marginal edge portions also in tension, an intermediate area under compression results. Then, by trimming the bent and annealed sheet to the desired finished size and shape through this region under compression, the marginal edges of the finished sheet will be in compression. Naturally, the greater the magnitude of the compressive stresses in the marginal edges of the finished sheet, the greater will be their resistance to physical damage. Also, since as noted above, in the sheet as a whole the compressive and tensile stresses balance, as it were, the magnitude of the compressive stress is dependant upon the magnitude of the tensile stress created in the sheet.

It is therefore a primary object of the present invention to provide an improved method of and apparatus for bending and annealing glass sheets.

Another object is to provide a method of bending and annealing glass sheets and of producing a preselected stress pattern in certain areas of the glass sheet.

Another object is to accomplish the foregoing by creating a pronounced differentiation in the cooling rate of preselected areas of said sheet.

Still another object is to control the cooling rate of specific areas of the sheet by supplementally heating these areas thereby maintaining them at an elevated temperature until the remainder of the sheet has been cooled.

The invention also resides in the novel construction of a bending apparatus having a strain bar, all or portions of which strain bar is heated during the annealing phase of the production of bent glass sheets.

Other objects and advantages of the invention will become more apparent during the course of the following description when taken in connection with the accompanying drawings.

In the drawings, wherein like numerals are employed to designate like parts throughout the same:

FIG. 7 is a plan view similar to FIG. 1 of a modified form of the invention;

FIG. 8 is a sectional view taken along line 8—8 in FIG. 7;

Figures 1, 2:
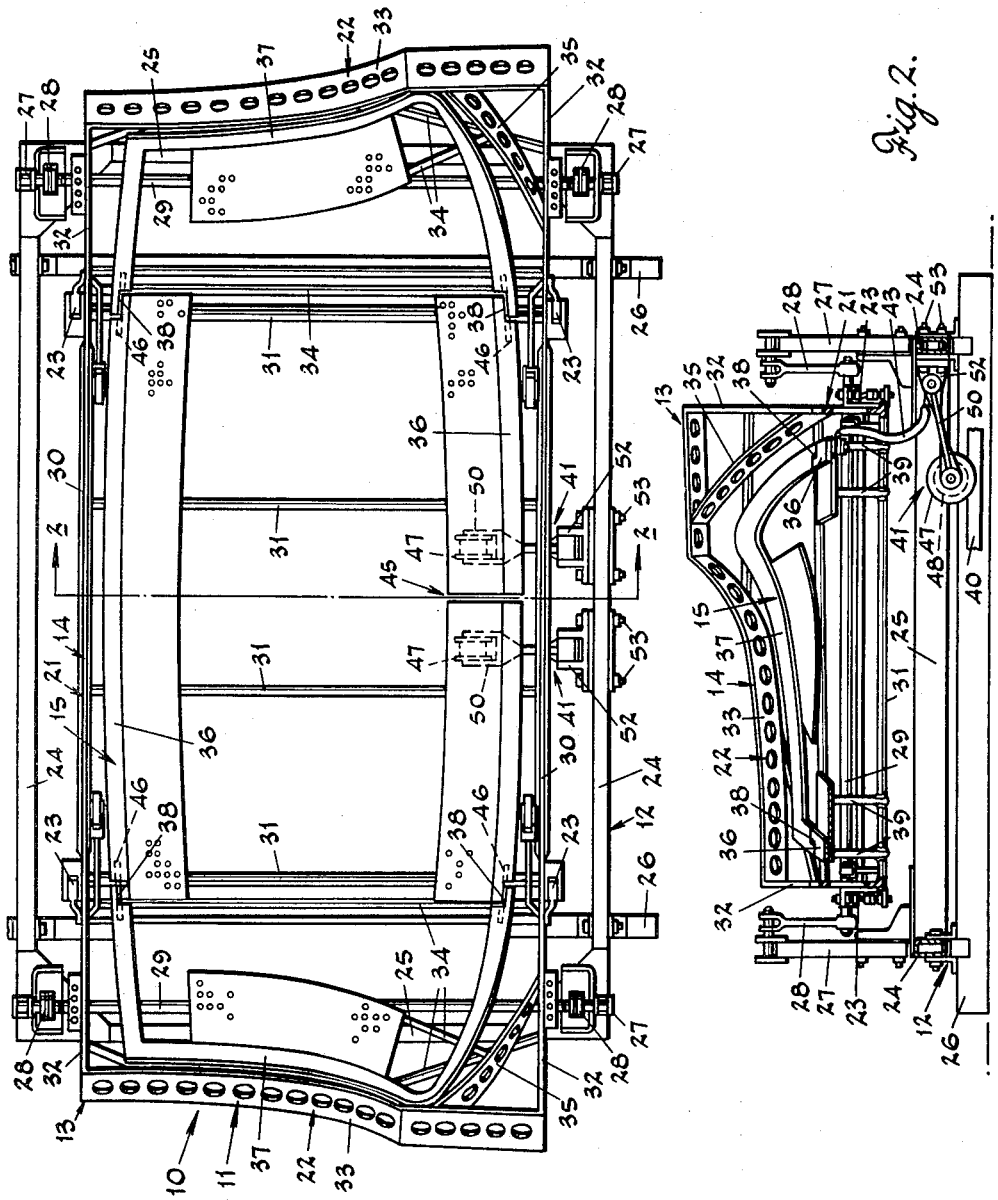
FIG. 1 is a plan view of a bending apparatus incorporating the novel features of the present invention.
FIG. 2 is a sectional view taken along line 2—2 of FIG. 1.

In the drawings for purpose of illustration is shown a bending apparatus 10 incorporating the novel features of the present invention and comprising, generally, an outline or skeleton type bending mold 11 adapted for use in bending blank side sheets and being supported on a rack 12. Broadly stated, an outline type bending mold of the above character is formed from relatively narrow shaping rails 13 arranged in a closed configuration which conforms in plan to the marginal outline of the glass sheets to be bent. Shaping surfaces 14 adapted to engage the marginal edge portions of the sheet and conforming, in elevation, to the desired curvature of the sheet when bent are formed on the upwardly directed edges of the shaping rails 13. To provide the desired stress pattern in the finished sheet, a heat retaining member or strain bar 15 having its periphery contoured to the desired outline of the pattern cut sheet, but somewhat smaller as compared thereto, is located within the confines of the shaping rails 13 and below the shaping surfaces formed thereon. As heretofore described, the shaping rails 13 and the strain bar 15 both function to retard the cooling of the areas of the glass sheets thereabove thus creating tensile stresses in these areas and compressive stresses in the intermediate area between the shaping rails and the strain bar.

Figure 3:
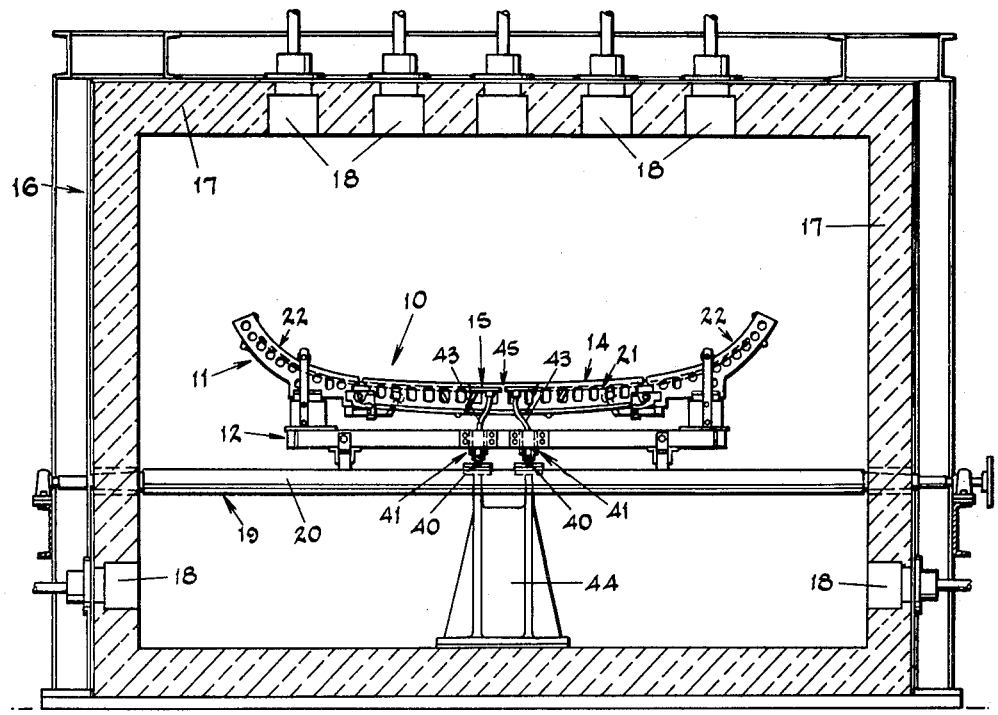
FIG. 3 is a transverse sectional view of a bending furnace showing the improved bending apparatus therein.

Now according to common bending procedures as outlined above, a flat glass sheet to be bent is supported on the mold 11 above the major portion of the shaping surfaces 14 and is subsequently moved through a tunnel type bending furnace 16 such as shown in FIG. 3. Generally, such furnaces 16 comprise insulated walls 17 defining a chamber heated by suitable burners 18 projecting through the walls. The bending apparatus 10 is moved through the furnace on a roller type conveyor 19 comprising a plurality of parallel rollers 20 spanning the heated chamber with each of the rollers being journaled in the opposed walls 17 of the furnace to rotate about a horizontal axis. As the flat glass sheet supported on the mold 11 is moved through the furnace 16, its temperature is elevated in a bending zone of the furnace to the softening point of glass permitting the sheet to sag into registry with the shaping surfaces 14 formed on the shaping rails 13. After the sheet is bent and while it is resting on the shaping surfaces, the mold and sheet are passed through an annealing zone of the furnace wherein the temperature of the sheet is reduced in a controlled manner to produce the desired stress pattern in the sheet.

The principle of creating two spaced bands of tension with an intermediate band of compression extending around a bent and annealed sheet, and subsequently trimming the sheet to a final pattern through the band of compression whereby the finished sheet will have marginal edge portions under compression, depends primarily upon the efficiency with which the strain bar and the shaping rails can retard the cooling of the overlying areas of the glass sheet and thereby maintain these areas at a higher temperature for a longer period of time than the remaining portions of the sheet. Since the glass sheet is in direct contact with the shaping surfaces 14 on the rails 13, the latter effectively retard the rate of cooling of the marginal edges of the sheet. The cooling retardation which may be effected by the strain bar is a function of its ability to absorb heat as the mold passes through the bending zone of the furnace and to radiate this heat to the sheet as the mold passes through the annealing zone of the furnace. Thus the efficiency with which a strain bar functions is dependent somewhat upon the particular material from which it is formed and upon its mass. It has been discovered, however, that there are definite limitations on the ability of the strain bar to absorb heat regardless of the material from which it is formed or its size. In other words, for any given material the mass of the strain bar may not be greater than that mass which may be heated throughout as it passes through the bending zone of the furnace.

In order to insure that the desired areas of the sheet will be held at an elevated temperature for a longer period of time than the remainder of the sheet and thus to insure that a definite stress pattern will be produced in the glass sheet, the present invention contemplates applying supplemental heat to preselected areas of the sheet as it is moved through at least a portion of the annealing zone of the furnace. While this supplemental heat may be supplied to the preselected areas of the sheet in various ways to maintain these areas of the sheet at an elevated temperature, a very effective way of accomplishing this end is to apply the supplemental heat to the strain bar rather than to the sheet itself. In this manner the ability of the strain bar to retard the cooling of the overlying areas of the sheet and thereby to maintain it at an elevated temperature for a prescribed period of time is not dependent entirely upon the amount of heat which the strain bar absorbs in the bending section of the furnace nor on its ability to radiate the absorbed heat to the glass sheet. Thus, it will be appreciated that by artificially heating the strain bar in the manner described, closer control over the differential cooling rate of the glass sheet may be obtained since the somewhat unpredictable factors, such as how much heat the strain bar will absorb and how readily this absorbed heat will be dissipated in the annealing zone, are not controlling.

Further in this connection, experience with molds of this general type has shown that, even when the strain bar is evenly spaced below the shaping surfaces of the mold, it may have less effect on some areas of the sheet than on other areas and thus does not produce a uniform stress pattern around the sheet. In those areas in which the strain bar is less effective in maintaining the overlying portions of the sheet at an elevated temperature during annealing, low magnitude compressive stresses or even tensile stresses may be produced in the edge portions of the finished sheet rendering the glass weaker and more susceptible to damage. The present invention enables increasing the effectiveness of selective segments of the strain bar by supplementarily heating these segments so that the entire strain bar will produce a near uniform pattern of compressive stress of acceptable magnitude.

The foregoing description of the bending apparatus and method of bending glass sheets is, of course, very general in nature and describes merely the essential elements and steps required in bending sheets of glass to simple curvatures. In other words, to bend glass sheets to these simple curvatures, an outline type bending mold need only comprise a continuous shaping rail defining a closed configuration and having shaping surfaces formed thereon to conform to the desired curvature. However, present day automobile designers in their endeavor to increase the viewing areas of automobiles, especially the forward and rearward viewing areas, have designed windshields and backlights which span not only the entire front or rear of the vehicle but which also extend through the adjoining corners and even slightly along the sides of the automobile. This rather intricate configuration, having a shallow curvature in the major portion of the sheet and sharp curvatures adjacent the ends, dictates the use of somewhat complicated bending apparatus which includes a sectionalized bending mold carried by a rack in a manner to enable the different sections of the mold to move relative to each other between an opened position operable to support the flat glass sheet prior to bending and a closed position conforming in curvature to the sheet when bent. As shown in FIG. 1, the mold 11 includes a central section 21 and two aligned and oppositely disposed end sections 22 hingedly joined at their adjacent ends as at 23 to permit relative movement between the sections.

The rack 12 on which the mold 11 is carried includes a pair of parallelly spaced side rails 24 joined to one another at their opposite ends by end rails 25 to form a rigid, substantially rectangular frame. To support this rack 12 on the conveyor 19 in the furnace 16, transverse guide rails 26 are secured underneath the side rails 24 of the rack adjacent the opposite ends thereof. A substantially vertical upright post 27 is spaced slightly inwardly from each of the opposite ends of the side rails and is secured to the rails in transversely aligned relationship. The mold 11 is suspended from links 28 having one end journaled to the upper end of the upright posts 27 and the opposite or lower end supporting a transversely disposed rod 29 attached to the end sections 22 of the mold 11.

The central section 21 of the mold 11 comprises spaced shaping rails 30 having the shaping surfaces 14 formed on their upper surfaces and defining a relatively large radius of curvature operable to provide a shallow bend in the major portion of the glass sheets. The shaping rails 30 are rigidly joined together by tie rods 31 spanning the rails with their opposite ends secured thereto.

The end sections 22 of the mold 11 are similar to each other in construction and include shaping rails conforming in plan to the outline of the ends of the sheets to be bent and having shaping surfaces formed on their upper edges. Each end section comprises a pair of upwardly curved parallel shaping rails 32 longitudinally aligned with the rails 30 of the center section 21 of the mold and joined at their outer ends by a transverse rail 33 extending across the end of the mold. The various shaping rails 32 and 33 comprising the end sections 22 of the mold are rigidly joined together into a unitary structure by tie rods 34 spanning the rails and fixed thereto as by welding. An additional shaping rail 35 extends diagonally between the transverse rail 33 and one side rail 32 to conform generally to the finished outline of the bent sheet (FIG. 1).

Carried within the confines of the shaping rails and below the shaping surfaces 14 formed on the rails is the strain bar 15 having a center portion 36 comprising two spaced bars and oppositely disposed and aligned U-shaped end portions 37 cooperating with the center portion to form a closed outline with its periphery contoured to, but being somewhat smaller than, the desired outline of the pattern cut bent sheet. The various portions of the strain bar 15 are fixed on the upper ends of posts 39 upstanding from the tie rods 31 and 34 on the center and end sections of the mold and thus move bodily with the corresponding mold sections as the latter swing between the open and closed positions. The opposite ends of the center portion 36 and the adjacent ends of the end portions 37 of the strain bar have complementary notches 38 formed therein and thus interfit with one another to form a substantially continuous structure when the mold is in the closed position.

In order to better control the stress pattern of the glass sheet in areas inwardly of the strain bar, various shields of well-known constructions are carried by the strain bar to effect the heating and cooling of various sections of the sheet according to commonly followed bending procedures.

As mentioned above, supplemental heat is supplied to at least portions of the strain bar 15 as the mold 11 passes through at least a portion of the annealing zone of the furnace, thus enabling the strain bar to maintain specific areas of the sheet at an elevated temperature for a longer period of time as compared to the remaining areas of the sheet.

It is not intended that the present invention be limited to any particular source of energy for supplemental heating the strain bar. Thus, for example, within the spirit of the invention, the supplementary heat could be supplied by a flame impinging on the strain bar as the mold passes through the desired zones of the furnace or the strain bar could be constructed in the form of a conduit through which a suitable heating medium is circulated. In a preferred embodiment of the invention, a detailed description of which follows, the supplementary heat is derived from electrical energy.

In accordance with another aspect of the invention, a novel apparatus is provided to simply, yet efficiently, supply supplemental heat to all or portions of the strain bar. Broadly stated, this is accomplished by electrically heating the strain bar 15 with the power being supplied by bus bars 40 extending through the desired zones of the furnace and carried to the strain bar through trolley-type electrical coupling means 41 carried by the bending apparatus 10. To this end, resistant-type electrical heating elements 42 are associated with the strain bar 15 and are coupled by means of a flexible conductor 43 to the coupling means 41 carried by the rack 12 and adapted to move along the bus bars 38 supported in the furnace 16 above the conveyor 19 by columns 44 resting upon the floor of the furnace.

Figure 5:
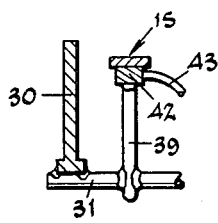
FIGS. 5 and 6 are similar fragmentary sectional views showing two modifications of a strain bar having a heating unit associated therewith.
Figure 6:
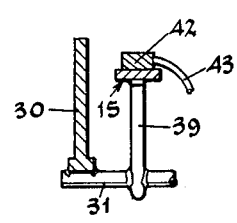
Figure 9:
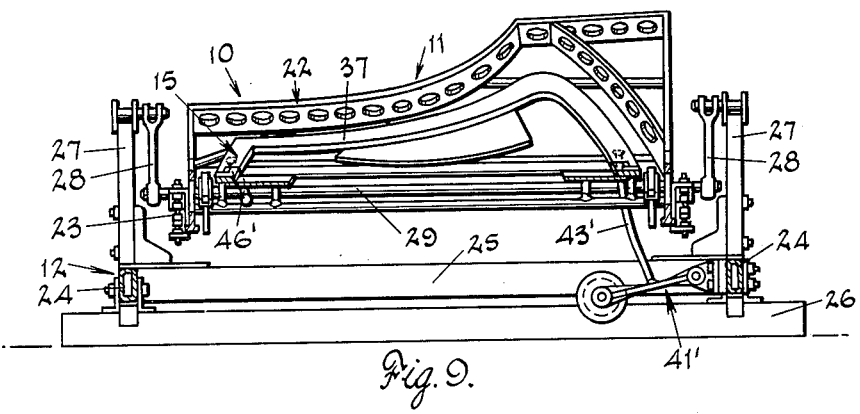
FIG. 9 is a sectional view taken along line 9—9 in FIG. 7.
Figure 10:
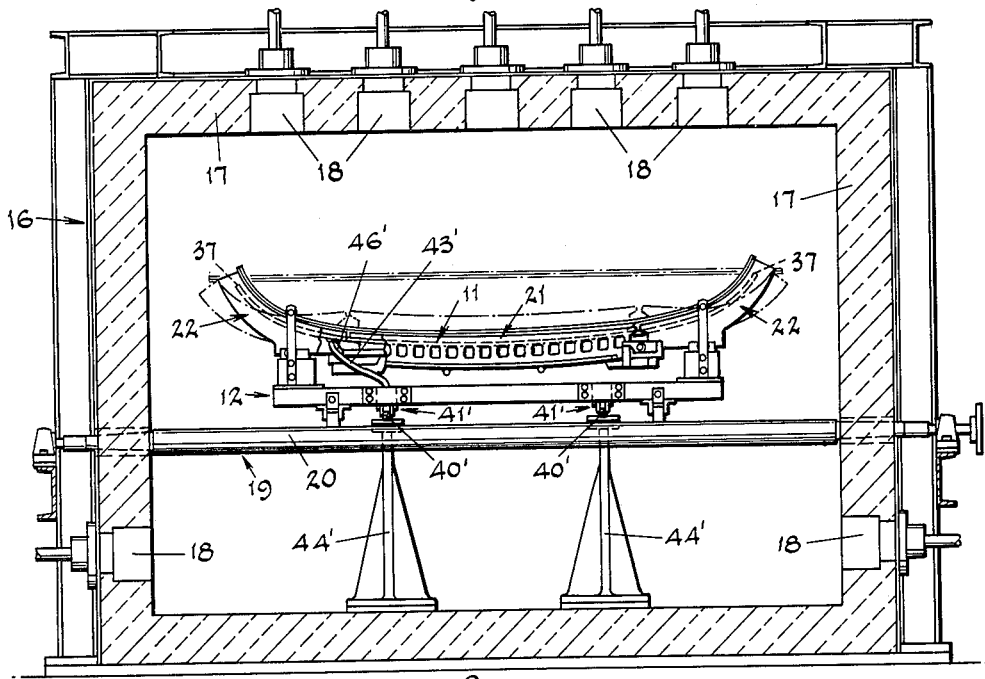
FIG. 10 is a transverse sectional view of a bending furnace similar to FIG. 3 and showing the modified form of the bending apparatus.

Any of the well-known types of electrical heating units 42 may be utilized to heat the strain bar 15. The units 42 may be mounted below the bar 15 as shown in FIG. 5, above the bar as shown in FIG. 6 or the units may be disposed within a hollow bar. If desired, rather than using a heating unit associated with a conventional strain bar, the strain bar itself or portions thereof may be formed from one of the commercially available electrical heating units.

In the embodiment of the invention illustrated in FIGS. 1 through 3, the entire strain bar 15 is heated by an electrical heating element 42 attached to the underside of the bar. To this end, the strain bar 15 is formed with a gap 45 in one of the bars constituting the center portion of the strain bar, which gap is located at substantially the center of the mold. Two coupling means 41 are mounted on the rack 12, one on each side of the gap 45, with each of the coupling means being connected to one end of the strain bar by the flexible conductors 43. At each of the notched areas 38, the adjoining ends of the center portion 36 and end portions 37 are interconnected by flexible conductor strips 46 as indicated in FIG. 1. Thus the current flows from one bus bar 40 through the flexible conductor 43 around the strain bar and back to the other bus bar 40 through the conductor 43 and second coupling means 41.

Figure 4:
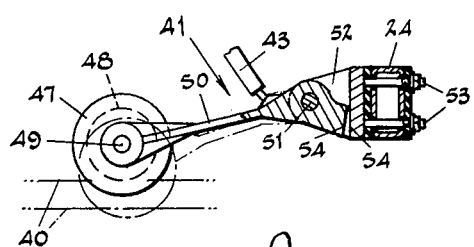
FIG. 4 is an enlarged view of the conducting roller.

In order to insure that the coupling means 41 remains in contact between the bus bars 40 as the mold moves along the conveyor 19, herein, each coupling means includes a wheel 47 having an outward opening groove 48 in its outer periphery, which groove receives one of the generally rectangular bus bars 40. As shown in FIG. 4, the wheel 47 is journaled on a rod 49 in one end of an arm 50 having the opposite end supported on a pin 51 in a clevis bracket 52 secured below the mold to the leading side rail 23 of the rack as by bolts 53. The arm 50 projects backwardly toward the trailing edge of the rack and is adapted to swing up and down about the pin 51 as an axis permitting the wheel 47 to move toward and away from the underside of the mold. The downward swinging of the arm 50 is limited by abutment surfaces 54 formed on the pinned end of the arm and on the clevis 52. As limited by these abutment surfaces 54, the arm 50 depends in an inclined position downwardly from the rack to carry the wheel 47 in a plane below the upper surface of the bus bars 40. As the wheel contacts the end of the bus bar, it is moved upwardly in an arcuate path toward the mold, turning about the pin 51 as an axis. As the mold moves through the furnace, each of the wheels 47 rides along a bus bar 40 with the latter received in the groove 48 and, upon reaching the opposite end of the bar, drops downwardly into the position determined by the abutment surfaces.

Bending glass sheets to the rather complicated configurations requiring rather sharp curvatures in various portions of the sheets is usually accomplished by subjecting the areas of sharp curvature to greater heat than the areas of relatively shallow curvature. This, of course, means that different temperatures will exist across the sheet. In order to insure that the desired differential in the cooling rate of the sheet will be more or less evenly maintained throughout the entire sheet, increased amounts of supplemental heat may be supplied to the strain bar in the areas having the greater temperature such as the areas adjacent the sharp bends. This may be accomplished in any well-known manner by increasing the resistance of the heating unit adjacent these areas and thus generating more heat in the strain bar at those areas.

As noted above, it has been found that in some instances certain segments of the strain bar function efficiently to impart the desired stresses to the glass sheets while other segments fail to provide stresses of the desired value or magnitude. In these cases, the present invention contemplates applying supplementary heat to the less efficient segments of the strain bar only and to permit the remaining segments to function in the normal manner by radiating the heat absorbed during the bending of the glass sheets as the latter are annealed. To this end, a modified embodiment of the bending mold hereinabove described is provided, in which embodiment supplementary heat is applied to preselected segments of the strain bar only. An example of such an embodiment is depicted in FIGS. 7 to 10 wherein a heating element is associated with the U-shaped end portions of the strain bar only and not with the center portions of the bar. In this modified form, the rack, the mold and the strain bar are as described above and are identified on the drawings by the same reference numerals. The structure of the coupling means and the bus bars is also the same. The modification departs from the formerly described construction in the configuration and disposition of the heating element and in the location of the coupling means and the bus bars and to aid in understanding the invention, the latter elements will be identified on the drawings by the same but primed reference numerals.

As indicated in FIG. 7, an electrical heating element is fixed to the underside of each of the U-shaped end portions 37 of the strain bar 15 and the coupling means 41' are disposed adjacent the opposite ends of the mold. Each of the coupling means 41' is connected to one end of the heating element on each of the end portions 37 of the strain bar by a flexible conductor 43'. The opposite ends of the heating elements are joined together by a conductor strip 46' extending through a conduit disposed below the center portion of the strain bar. The current flows from one of the bus bars 40', passes through the coupling means 41', the flexible conductor 43', around the U-shaped end portion 37 of the strain bar through the conductor strip 46', around the other U-shaped end portion and back to the second bus bar 40' through the conductor 43' and the second coupling means 41'.

It will be apparent that while in the illustrated embodiment the entire end portions 37 of the strain bar are heated, it is within the spirit of the invention to heat any part of the strain bar with the parts not being heated being shunted by conductor strips such as the illustrated strip 46'.

Heating of the strain bar may be commenced at any point as the mold moves through the furnace and may be continued through the annealing phase as the major portions of the sheets are cooled until the desired stress pattern is achieved. Preferably the bar 15 would begin to be heated when the mold is either in or closely adjacent to the bending zone of the furnace and while the sheet is at the elevated bending temperature. The supplemental heating would be discontinued at a point within the annealing zone of the furnace whereat the remainder of the sheet has cooled to a temperature below 900° F.

Initiating the application of the supplemental heat near the beginning of the annealing phase of the operation and discontinuing the supplemental heat after the sheet has cooled to the desired temperature may be effected by any suitable switching means operable to selectively connect and disconnect the bus bars 40 or 40' with a source of electrical power. This switching means may be activated by a variety of well-known control means responsive to the movement of the molds through the furnace or to the temperature of the sheets.

One very simple yet effective manner of controlling the supply of power to the heating elements is to provide bus bars which extend through those portions of the furnace wherein the supplemental heating is desired. With this arrangement, as the mold 11 moves along the conveyor 19, the coupling means 41 carried by the rack 12 contacts the one end of the bus bars 40 whereupon current flows to the heating element and rides along the bus bars to maintain the flow of current for the desired length of time. The flow of current is interrupted when the coupling means drops off the end of the bus bars.

The amount of heat generated by the heating elements depends upon the amount of current flowing through the elements and this, in turn, depends upon the amount of power supplied to the bus bars. In order to control the amount of supplemental heat applied to the strain bar in the present invention, means are provided to control the power supply to the bus bars. Moreover, means are provided to supply different amounts of supplemental heat to the strain bar as the mold passes through different locations in the furnace. In this regard, it will be apparent that as the mold, with the heated sheet rested thereon, is carried through the annealing zone of the furnace, the temperature of the glass is progressively decreased and it has been found that the amount of heat required to accomplish the desired result depends upon the temperature of the glass and also depends on the desired magnitude of the stresses to be imparted to the sheet by this heat.

Figure 11:
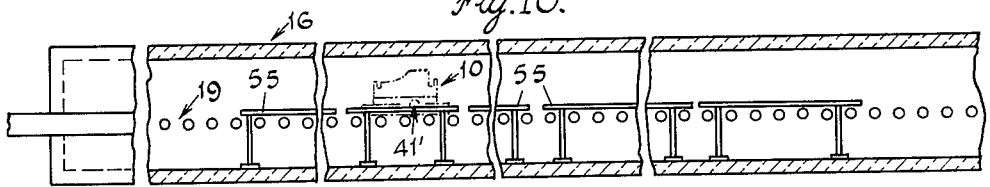
FIG. 11 is a fragmentary longitudinal section of a bending furnace.

To enable varying the heat in the above-described manner, the bus bars which extend through at least a portion of the annealing zone are divided into segments 55 of preselected lengths and the power supply to each of the sections is individually controlled (FIG. 11). In this manner, varying amounts of power may be supplied to the different segments of the bus bars. As the mold 10, shown in phantom in FIG. 11, is carried through the annealing zone by the conveyor 19, the coupling means engage the successively arranged segments 55 of the bus bars and conduct current from the segments to the heating elements on the mold. The amount of heat generated by the heating element is determined by the current supplied by the individual segments over which the mold passes. In addition, any of the segments 55 of the bus bars may be individually disconnected from the power supply altogether whereby the points at which the heating commences and/or terminates may be regulated rendering the furnace more versatile since changing the duration of the application of supplemental heat does not require modification of the bus bars mounted in the furnace.

In operation, a flat sheet of glass is supported on the bending mold 11 and is moved through the bending zone of the furnace 16 permitting the sheet to sag into the fully bent curvature with the mold in the closed position. Thereafter the mold 11 is carried by the conveyor 19 into the cooling atmosphere of the annealing zone of the furnace. At this phase of the operation, the glass begins to lose heat according to the controlled and gradually reduced temperature of the annealing zone. Closely adjacent the location in the furnace 16 wherein the bending zones and annealing zones merge, power is supplied to the resistance heating elements. The residual heat retained in the shaping rails and the heat retained and/or generated in the strain bar 15 maintain the areas of the sheet above these elements at an elevated temperature as the mold moves through the annealing zone. Upon reaching a point in the annealing zone when the remainder of the sheet has cooled to a temperature below the annealing range of glass, the supply of power to the heating elements is interrupted and the entire sheet is allowed to cool to substantially room temperature as it advances toward the unloading end of the furnace. The delayed cooling effected by the shaping rails and by the strain bar in the predetermined areas of the sheet will have created regions above these elements which are in tension and an intermediate area, in the form of a continuous path extending around the sheet, which is in compression. This closed path or band of compression substantially corresponds to the peripheral outline of the pattern sheet to be cut from the bent sheet, therefore, when the bent sheet is removed from the mold, it is only necessary to cut the sheet through the band of compression to produce a pattern bent sheet having its peripheral edge in compression.

It will be appreciated that the present invention enables the production of bent glass sheets having marginal edge portions which are materially stronger and resistant to damage as compared to sheets produced by prior-known methods. Moreover, bent sheets produced on a bending apparatus of the above-described character have their marginal portions uniformly stressed around the entire periphery. That is to say, by supplying heat to different portions of the margin of the glass sheet, weak spots may be substantially eliminated. In addition, the present invention removes the unpredictable factors heretofore encountered in the bending and annealing of blank size glass sheets. More specifically, the strength of the edge portions of the sheet is not dependent upon the amount of heat absorbed by a strain bar or the rate at which this strain bar cools in the annealing zone of the furnace. The desired areas of the sheet may be maintained at an elevated temperature for any desired period of time. Thus the present invention allows close control of the temperature at which areas above the strain bar will be maintained and over the period of time these areas will be maintained at the elevated temperatures.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. Apparatus for bending an annealing glass sheets, comprising an outline type bending mold having a substantially continuous shaping surface formed thereon and conforming to the margin of the glass sheet to be bent, and a substantially continuous means for generating heat energy carried by said mold and enclosing an open area spaced inwardly from said shaping surface and operable to heat a relatively narrow continuous area of the glass sheet spaced inwardly from the margins thereof.

2. Apparatus for bending and annealing glass sheets as defined in claim 1, in which said heating means for generating heat energy comprises an electrical resistance-type heating unit, and means coupling said heating unit to a source of electrical energy.

3. Apparatus for bending and annealing glass sheets, the combination of a bending mold comprising a substantially continuous shaping rail conforming to the margin of the glass sheet to be bent and having a shaping surface formed on an upwardly directed face thereof, a substantially continuous strain bar carried by said mold within the confines of said shaping rail, said strain bar being spaced inwardly of said shaping rail and below said shaping surface, and supplemental heating means carried by portions of said strain bar and operable to maintain said portions at a predetermined temperature.

4. Apparatus for bending and annealing glass sheets as defined in claim 3, in which said heating means comprises an electrical resistance-type heating unit fixed to said strain bar, and means coupling said heating unit to a source of electrical energy and being operable to selectively initiate and discontinue the heating of said unit.

5. Apparatus for bending and annealing glass sheets as the latter are carried along a predetermined path through a furnace, comprising an outline type bending mold having a substantially continuous shaping rail with an upwardly directed shaping surface formed thereon to engage the marginal edge portions of said sheet when bent, a substantially continuous strain bar mounted on said mold and disposed inwardly of said shaping rail and below said shaping surface, an electrical heating unit carried by said strain bar, bus bars mounted within said furnace and extending along a portion of said path, and means coupling said heating means to said bus bars to convey electrical energy to said heating means.

6. Apparatus for bending and annealing glass sheets as defined in claim 5, wherein said bus bars are divided into a number of individually controlled segments disposed end-to-end along said portion of said path.

7. Apparatus for bending and annealing glass sheets, comprising a tunnel type furnace defining a chamber having contiguous bending and annealing zones therein, a conveyor extending along a predetermined path through said chamber, an outline type bending mold with shaping surfaces formed thereon to engage the marginal edge portions of a glass sheet when bent, means supporting said bending mold on said conveyor for movement along said path through said furnace, a substantially continuous strain bar mounted on said mold and disposed inwardly of and downwardly from said shaping surfaces, an electrical heating unit mounted on said strain bar, bus bars mounted in said furnace and extending along said path, coupling means mounted on said mold and adapted to engage each of said bus bars as said mold is carried along said path by said conveyor to conduct electrical energy from said bus bars to said heating means.

8. Apparatus for bending and annealing glass sheets as defined in claim 7, in which each of said coupling means comprises an arm journaled at one end on said mold, a wheel journaled to the other end of said arm and adapted to roll along a bus bar as said mold is carried along said predetermined path.

9. Apparatus for bending blank size flat glass sheets and subsequently annealing the bent glass sheets prior to pattern cutting sections of predetermined size and shape therefrom, comprising an outline type bending mold having a substantially continuous shaping rail, a shaping surface formed on said shaping rail and conforming in curvature and outline to the glass sheet when bent, a substantially continuous strain bar mounted on said mold and disposed inwardly of and below said shaping surface, an electrical resistance-type heating unit fixed to said strain bar, and means coupling said heating unit to a source of electrical energy thereby to supply supplementary heat to said strain bar to retard the cooling of said areas of said sheet above said strain bar.

References Cited by the Examiner

UNITED STATES PATENTS

| | | | |
|---|---|---|---|
| 2,897,632 | 8/1959 | Fowler et al. | 65—103 |
| 2,963,822 | 12/1960 | Carson | 65—288 |
| 2,999,338 | 9/1961 | Richardson | 65—289 X |

FOREIGN PATENTS

| | | |
|---|---|---|
| 102,836 | 12/1937 | Australia. |

DONALL H. SYLVESTER, *Primary Examiner.*

ARTHUR D. KELLOGG, *Examiner.*